Patented July 7, 1925.

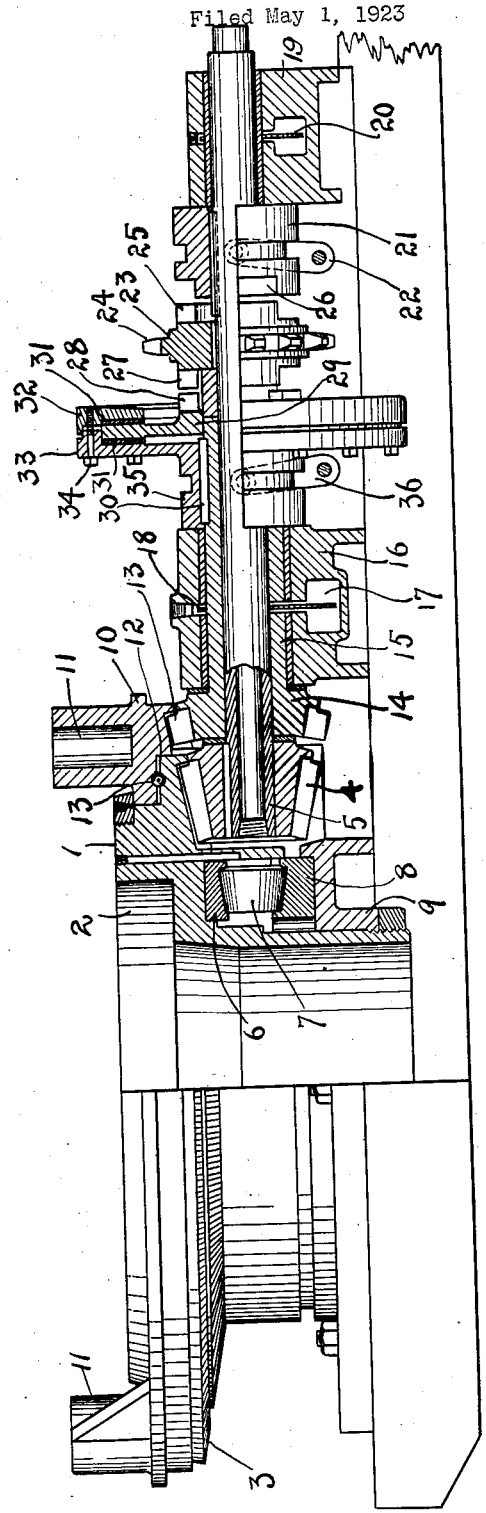

1,544,703

UNITED STATES PATENT OFFICE.

WALTER C. TROUT, OF LUFKIN, TEXAS.

CLUTCH MECHANISM FOR ROTARIES.

Application filed May 1, 1923. Serial No. 635,863.

*To all whom it may concern:*

Be it known that I, WALTER C. TROUT, a citizen of the United States, residing at Lufkin, Angelina County, Texas, have invented a certain new and useful Improvement in Clutch Mechanism for Rotaries, of which the following is a full, clear, and exact description, such as will enable others skilled in the art to which it appertains to make and use the same.

My invention relates to an improvement in driving connections for rotary tables used in the rotary drilling art.

In the drilling of oil wells it is customary to operate the rotary drill stem by means of connection with a rotary table operated from a source of power. My device is particularly adapted for use with rotary tables having a central drill stem-operating table upon which the drill stem may be supported, and an additional outer annular table rotatable about the central one and separately driven, so that the power may be used in screwing up the joints of the drill stem while they are being connected, preliminary to going into the hole.

In the use of the power for rotating the wrench which engages one portion of the tool joint while the joint is being connected, the result occasionally is that the joint is screwed up too tightly, due to the fact that it is difficult to stop the rotary at the moment that the joint is made fast.

It is an object of my invention to provide a clutch mechanism between the operating shaft and the rotary table whereby the table may be automatically stopped when the joint is screwed tight, and thus avoid the mutilation of the threads of the joint. The purpose is, more broadly, to take the strain of the rotation of the power-driven shaft from the operated tool when the load becomes excessive.

The further objects and advantages of the device will be shown more clearly in the description which follows:

Referring to the drawing herewith, wherein a preferred embodiment of the invention is disclosed, I have shown a side elevation of a rotary, one half of which is shown in central longitudinal section, and a similar section of the driving mechanism connected therewith whereto my invention has been applied.

In illustrating the application of my invention, I have shown a common type of double rotary table. This table comprises a central circular table 1 having an opening 2 therethrough to receive a gripping bushing whereby the drill stem or pipe may be supported. There is on the lower outer side of this table a row of gear teeth 3 which is adapted to cooperate in use with a beveled gear 4 upon the inner end of an operating shaft 5. The table 1 is supported upon a bearing member 6 resting upon a series of roller bearings 7, supported upon a lower track 8 which is in turn supported upon the base 9.

There is also an outer annular table 10 fitting closely around the outer face of the central table 1 and adapted to rotate independently of the central table. This outer table has two upstanding sockets 11 thereon to receive the lower end of a breakout post, not shown. The lower face of the outer table rests upon a bearing surface 12 on the outer periphery of the inner table, and there may be a series of non-friction bearings 13 between the two surfaces. On the outer portion of the table 10 and on the under side thereof are gear teeth, adapted to mesh with teeth 13 upon a driving gear 14 mounted for rotation upon the power shaft 5. Said gear 14 is integral with the sleeve 15 rotatable on the shaft. Said sleeve is supported adjacent the gear 14 by a bearing member 16, said bearing member being lubricated from a chamber 17 by means of a chain oiler shown somewhat diagrammatically at 18.

The power shaft 5 is supported on its outer end in a similar bearing 19 adapted to be lubricated by means of a chain oiler 20.

Closely adjacent the outer bearing 19 is a slidable clutch member 21 of the dental type adapted to be slidable upon the shaft by means of a clutch lever 22 of the usual type. Adjacent the clutch, which is keyed to the shaft, is an idle sprocket wheel 23 having teeth 24 thereon adapted to be engaged by a sprocket chain operated from some source of power, not shown. This sprocket wheel 23 has teeth 25 adapted to engage with the teeth 26 upon the clutch 21 when said clutch is moved into mesh therewith. On the opposite side of the sprocket wheel 23 are similar teeth 27 adapted to engage with the teeth 28 upon a clutch disc 29. This disc is mounted upon the sleeve 15 and is adapted to rotate thereon. Said disc extends radially outward from the sleeve and fits, adjacent its periphery, between two frictional washers 31 which are clamped against the side faces of the disc by means of a clutch device comprising a plate 32 on one side and a disc 33 on the other side, said plate and disc being secured together adjustably by means of pins or set screws 34 adjacent the outer edge thereof. The plate or disc 33 is formed integral with the clutch sleeve 35, keyed to the end of the sleeve 15 by means of a feather, 30. This clutch is slidable along the sleeve and operated by means of a clutch lever 36.

In the operation of screwing up the joints on a pipe while it is being inserted within the well, the pipe already within the well is supported on pipe-engaging means fitting within the seat 2 in the rotary. The joint is supported above the table and a wrench or other pipe-clamping means is secured to the joint which is to be screwed to the pipe supported in the rotary. This wrench is operated through a post in the outer table 10 so that the rotation of the table 10 carrying with it the wrench operated thereby will rotate the joint of pipe and cause it to be screwed together. It will be noted that the outer table 10 is operated through the gear 14, the sleeve 15 and the friction clutch as shown at 31, 32 and 33, by engaging the said clutch with the operating sprocket wheel 23 in the usual manner. The rotation of the sprocket wheel will rotate the disc 29, and said disc, through the frictional contact with the clutch plate 32 will rotate the gear sleeve 15. When, however, the joint has been secured tightly together, the force of the operating table will tend to mutilate the pipe and the joint before the clutch may be shifted to stop the rotation of the table. In such case the load thrown on the table through the contact of the parts of the pipe joint with each other, will cause the clutch discs 32, 33 to slide along the frictional surface 31 and allow the disc 29 to rotate without driving the table. I contemplate, by experiment, to so adjust the friction between the disc 29 and the clutch discs 32 and 33 that the parts will slip relative to each other as soon as the load exerted upon the joint which is being operated upon has reached a certain desired amount and no more. In this way the wrench will not be caused to slip upon the pipe and thus mutilate it and the threads will not be jammed together beyond their limit; and injury to the pipe and the joint will be avoided. It will be obvious that this idea may be applied to any rotary used in screwing up pipe and I do not wish to be limited to the particular rotary shown. The invention will have many obvious advantages which will be apparent to one skilled in the art without further description.

Having thus described my invention, what I claim as new and desire to protect by Letters Patent, is:

1. In a rotary, an inner rotary table for rotating the drill stem in drilling operations, an outer annular table separately operable to screw up pipe joints, an operating shaft for said rotary table, a sleeve rotatable on said shaft, a gear thereon operatively engaging said annular table for rotation, an operating gear on said shaft, and a clutch to connect said gear to said sleeve having slip friction means therein adapted to slip when the resistance to the screwing up of pipe joints becomes excessive in the manner and for the purpose described.

2. In a rotary, an inner rotary table for rotating the drill stem in drilling operations, an outer annular table for use in screwing up pipe joints, separate driving shafts for operating each said table, a driven gear, and slip friction means to operatively connect said gear to the driving shaft of said annular table, whereby said table may automatically stop rotating when resistance to screwing up of said pipe joints becomes excessive.

In testimony whereof, I hereunto affix my signature this 25 day of April, A. D. 1923.

WALTER C. TROUT.